March 13, 1951 F. E. BACHMAN 2,544,874
SIDE BEARING
Filed July 19, 1946 2 Sheets-Sheet 1
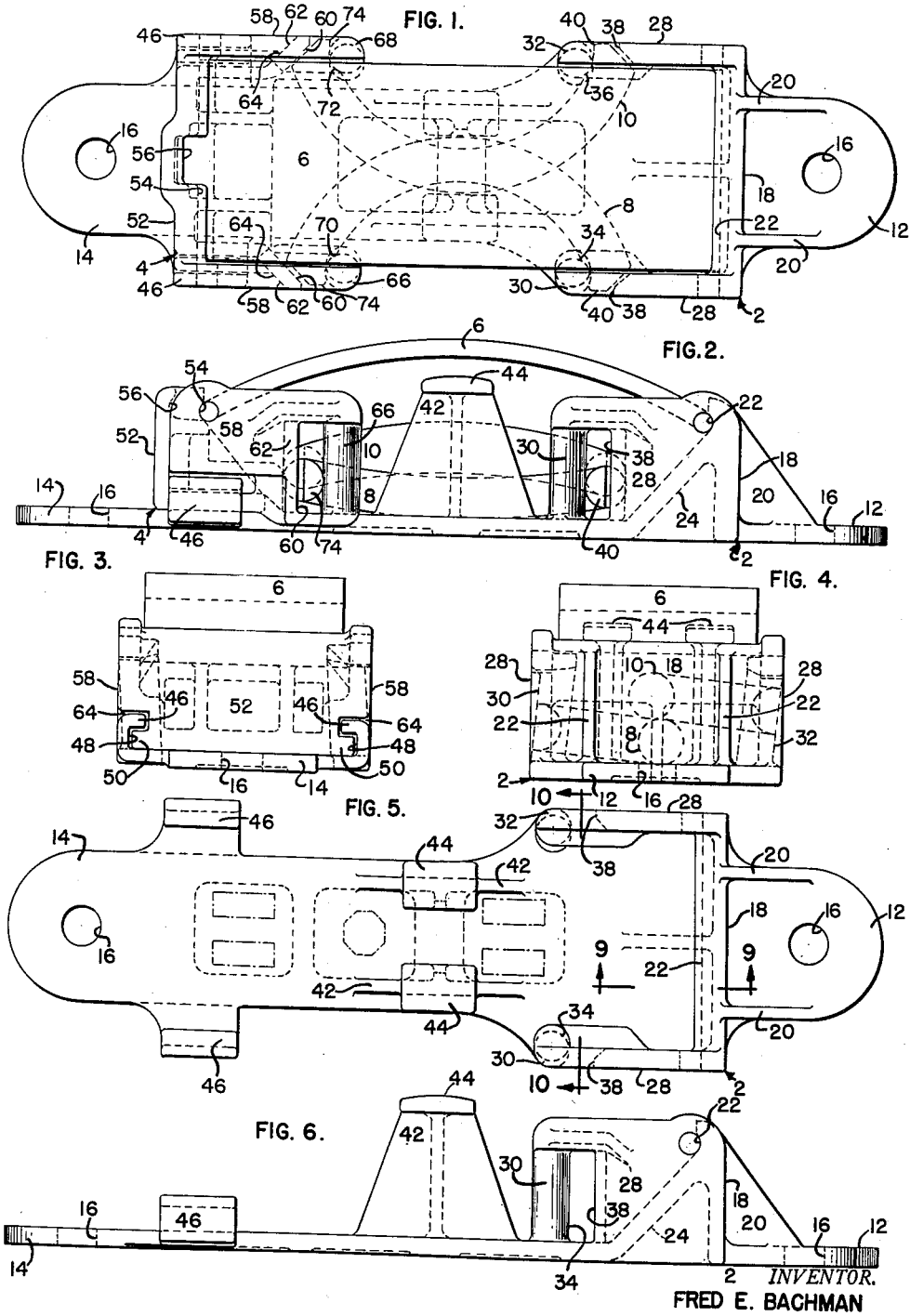
INVENTOR.
FRED E. BACHMAN
BY
ATTORNEY March 13, 1951  F. E. BACHMAN  2,544,874
SIDE BEARING
Filed July 19, 1946  2 Sheets-Sheet 2
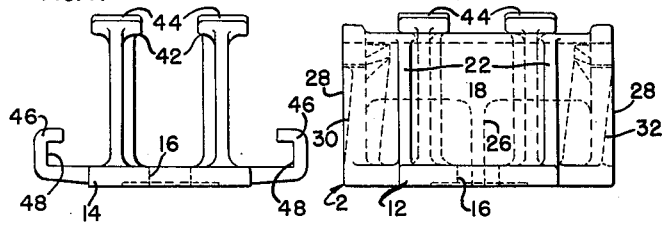
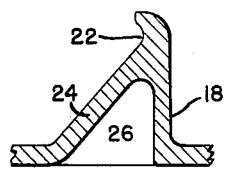
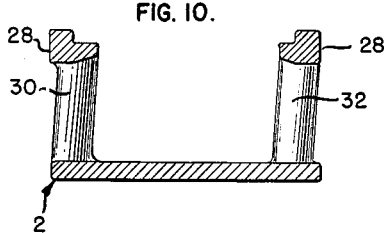
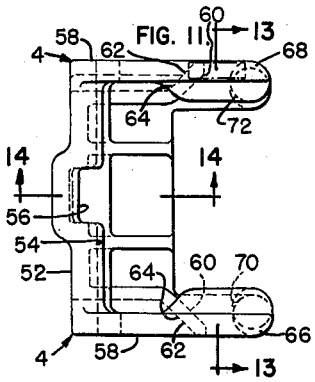
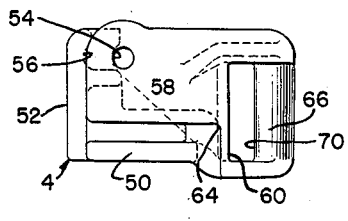
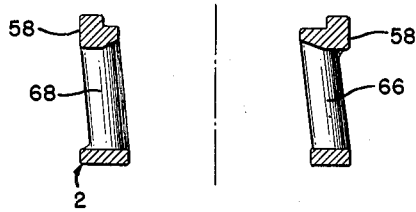
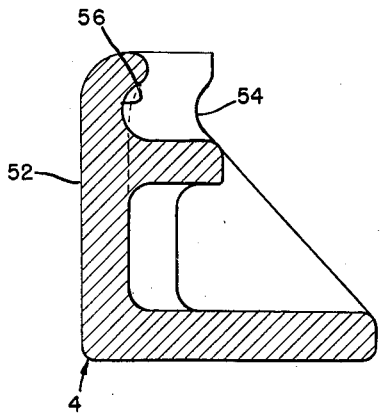
INVENTOR.
FRED E. BACHMAN
BY
ATTORNEY Patented Mar. 13, 1951

2,544,874

UNITED STATES PATENT OFFICE 2,544,874

SIDE BEARING

Fred E. Bachman, Chicago, Ill., assignor to American Steel Foundries, Chicago, Ill., a corporation of New Jersey Application July 19, 1946, Serial No. 684,893

13 Claims. (Cl. 267—3)

My invention relates to a shock absorber mechanism and more particularly to an improved design of the basic idea shown and described in W. C. Drews Patent 1,958,188, issued May 8, 1934, and R. B. Cottrell Patent 2,247,574, issued July 1, 1941.

An object of my invention is to provide an improved shock absorbing device particularly adaptable for use as a side bearing for railway cars.

A further object of my invention is to produce a side bearing of reduced weight and dimensions while preserving maximum resiliency characteristics of side bearings heretofore used, the reduction of dimensions being necessitated by the trend of development of brake and truck designs tending toward compactness.

My invention comprehends a type of side bearing which will offer smooth resistance to car body roll and which will prevent the development of synchronous yawing of the car body.

Another object of my invention is to provide such a side bearing having greater spring capacity for a given space.

Other objects and details will be more apparent from the description of the associated drawings, wherein:

Figure 1 is a top plan view of an embodiment of my novel shock absorbing device, Figure 2 is a side elevation thereof;

Figure 3 is an end elevation taken from the left of the structure shown in Figures 1 and 2;

Figure 4 is an end elevation taken from the right of the structure shown in Figures 1 and 2;

Figure 5 is a top plan view of the base plate used in my novel structure; Figure 6 is a side elevation thereof;

Figures 7 and 8 are end views taken from the left and right, respectively, as seen in Figures 5 and 6;

Figure 9 is a longitudinal section taken in the plane indicated by the line 9—9 of Figure 5;

Figure 10 is a sectional view, taken in the transverse vertical plane indicated by the line 10—10 of Figure 5 and looking in the direction of the arrows;

Figure 11 is a top plan view of the saddle casting used in my invention; Figure 12 is a side elevation thereof;

Figure 13 is a sectional view taken in the transverse vertical plane substantially as indicated by line 13—13 of Figure 11, looking in the direction of the arrows; and Figure 14 is a sectional view taken in the longitudinal vertical plane substantially bisecting the saddle casting as indicated by line 14—14 of Figure 11.

My invention consists generally of the following principal parts, a base plate 2, a saddle casting 4, a flat arched spring 6, and two truss springs 8 and 10, respectively. The base plate 2 has at its ends securing lugs 12 and 14 with the central openings 16, 16 therein for reception of securing bolts. At the juncture of said lug 12 with the main body of the base plate 2 is an end wall 18 formed integrally with the base plate, said wall being reinforced by ribs 20, 20. On the inner surface of the end wall 18 adjacent the top and transversely thereof is formed a shallow arcuate seat 22 for seating one end of the arch spring 6. Immediately below said seat 22 the upturned end 24 (Figure 9) of the base plate joins said end wall 18, said wall and said upturned portion of the base plate being reinforced by the vertical center rib 26 (Figure 9), said rib being parallel to and interposed between vertical lateral walls 28, 28 formed on the opposite sides of said end wall. The lateral walls 28, 28 are merged with postlike structures or anchor means 30 and 32, said posts having arcuate surfaces as at 34 and 36 adjacent the mid-portions thereof and inclining from the vertical in approximately parallel diagonal planes, as may be seen in Figure 10. The walls 28, 28 have cored out openings 38, 38 for reception of the hooklike ends 40, 40 of the truss springs 8 and 10, said truss springs being partially superposed and lying in approximately parallel diagonal planes and having their respective ends seated upon said arcuate surfaces 34 and 36.

It will be apparent to those skilled in the art that by partially superposing the said truss springs and positioning them in approximately parallel diagonal planes, I have secured maximum spring capacity within the dimensions of the side bearing and, furthermore, by having the clamping points of the truss springs in approximately the same plane, I have prevented the castings from twisting with respect to each other. In addition, it is obvious that with my invention, side bearings of smaller dimensions can be made without sacrificing the resiliency characteristics of larger side bearings heretofore used.

Centrally of the casting and at opposite sides thereof are formed the studs 42, 42 having top surfaces of arcuate form as indicated at 44 (Figure 7), said surfaces providing limiting stops for the flexing of the arch spring 6 when placed under load. Between said studs 42, 42 and the securing lug 14 are formed two flanged and reflanged retaining ears 46, 46 at the opposite sides of the base plate, as seen in Figures 5 and 7, the said ears defining channel guideways 48, 48, as shown in Figures 3 and 7. Riding within said channel guideways 48, 48 are lateral guide and retaining flanges 50, 50 (Figure 3) formed integrally at the opposite sides of the movable saddle casting 4.

The saddle casting has an end wall 52 in which is formed a shallow transverse channel 54 for seating the opposite end of said arch spring 6. The end wall 52 is recessed centrally thereof to form the tool pocket 56 for a purpose hereinafter described. At the opposite sides of the saddle casting are formed vertical lateral walls 58, 58 which have openings 60, 60 for reception of the opposite ends of the truss springs, said openings having their outer extremities limited by the flaring flanges 62, 62 (Figure 11), the outer edges 64, 64 of said flaring flanges acting as stops against the inner edges of the retaining ears 46, 46. The openings 60, 60 are defined at their inner edges by the postlike structures or posts 66 and 68 (Figure 13) having arcuate surfaces as at 70 and 72, respectively, forming seats for the hooklike ends 74, 74 (Figure 1) of the truss springs, said posts 66 and 68 being inclined from the vertical as may be seen in Figure 13. It will be noted that the cylindrical posts 30 and 32 and 66 and 68 are parallel or approximately so and are inclined from the vertical or diagonally disposed with respect to the plane of the base plate so that the spring seat surfaces thereon are positioned substantially perpendicularly to the planes of said truss springs, thus affording the hooked ends of the truss springs full face seating at approximately right angles thereagainst whereby any tendency on the part of said springs to flex out of plane is eliminated and thus any twisting of the saddle casting relative to the base plate is precluded. It will be noted that the springs and posts are diagonally arranged in reverse directions with respect to the plane of the base plate and this feature, together with the idea of superposing the truss springs, allows for accommodating springs of maximum length and capacity within the space available between the arch spring 6 and the base plate 2.

Each of the truss springs 8 and 10 are made of round bar spring stock with the central portion thereof of uniform curvature with the ends (Figure 1) terminating in hooklike structures 40 and 74 upon the inner faces of which are formed arcuate surfaces complementary in form to the already described arcuate surfaces of the posts.

To assemble the side bearing, the saddle casting 4 is mounted on the base plate by sliding flanges 50, 50 into the slots 48, 48 from the inner ends of the slots, the movement thereof being limited by abutments or stops 64, 64 on the flaring flanges 62, 62 of the saddle casting against the inner edges of the retaining ears 46, 46. The truss springs 8 and 10 are next inserted. Finally, the arch steel spring 6 is inserted in the groove 22 and the slidable saddle casting is forced apart either by power means or a hand tool inserted in the tool pocket 56 so that the opposite end of the arched steel spring may be seated in the channel 54. Upon application of a load upon the arched steel spring, the said spring will flex, forcing the saddle casting to slide in a direction away from said center studs 42, 42, the said movement of the saddle casting being restrained by the simultaneous flexing of the truss springs with the arched flat spring.

I have so designed the parts that if the arch spring be lost or destroyed, the other parts will be retained in assembly and may be reused with a new arch spring.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a shock absorber, a substantially horizontal base plate having adjacent one end an upstanding transverse abutment with spaced posts inclined from the vertical in the same direction, an upright sliding transverse abutment mounted on said plate adjacent the opposite end thereof and having spaced posts sloping from the vertical in the same direction as the first-mentioned posts, a plurality of partially superposed truss springs supported on said plate substantially centrally thereof and lying in approximately parallel diagonal planes and having their opposite ends engaging a post on said fixed abutment and a post on said sliding abutment respectively, and an arch spring overlying said truss springs flexed between said abutments serving to spread them apart and to flex said truss springs opposing said spread.

2. In a shock absorber, a base plate, fixed and movable abutments thereon, an arch spring flexed between said abutments, and a plurality of truss springs arranged in overlapping relation diagonally disposed with respect to said base plate and reacting against respective abutments along surfaces diagonally disposed with respect to said base plate.

3. A shock absorbing device comprising a substantially horizontal base plate, upstanding fixed and movable abutments thereon, anchor means on each of said abutments spaced laterally of said plate, resilient means flexed between said abutments for urging them apart, stop means on said plate spaced laterally thereof and adapted to cooperate with said resilient means to limit flexing thereof upon the imposition of a load thereagainst, and a plurality of partially superposed truss springs interposed between said stop means and hooked to adjacent anchor means on respective abutments, all of said anchor means sloping from the vertical in the same direction laterally of said plate.

4. In a shock absorber, a generally horizontal base plate, integral and slidable upstanding abutments comprising posts supported thereon, a flat arch spring flexed between said abutments to urge them apart, a truss spring assembly comprising a plurality of partially overlapping truss springs lying in approximately parallel diagonal planes supported on said plate between said abutments, said truss springs having their opposite ends hooked to a post on said integral abutment and to a post on said sliding abutment respectively, said posts extending substantially perpendicularly to said planes.

5. In a shock absorber, a base plate, fixed and slidable abutments thereon, anchor posts on said abutments, a plate spring flexed between said abutments, a plurality of overlapped truss springs between said base plate and said spring plate and positioned in generally parallel planes diagonally with respect to the plane of said base plate and hooked at opposite ends to the anchor posts of respective abutments, said anchor posts lying in planes arranged substantially perpendicular to the planes of said truss springs.

6. In a shock absorbing device, a substantially horizontal base plate, transverse fixed and movable upstanding abutments with posts at opposite sides thereof supported on said plate, said posts being parallel or approximately so and diagonally inclined, a plate spring flexed between said abutments to urge them apart, a plurality of overlapping truss springs lying in approximately parallel diagonal planes hooked to said posts adjacent the midportions thereof, said truss springs resisting the action of said plate spring and providing substantially balanced spring action at opposite sides of said abutments.

7. In a shock absorbing device, a base plate, fixed and slidable abutments thereon, a plate spring flexed between said abutments to urge them apart, anchor posts on respective abutments spaced laterally of said base plate and lying in substantially parallel planes extending longitudinally of said base plate diagonally with respect to the plane thereof, and overlapping truss springs lying in approximately parallel planes disposed substantially perpendicular to said first-mentioned planes, each truss spring having its ends hooked to associated anchor posts on respective abutments.

8. In a shock absorber, a base plate, fixed and movable abutments thereon, an arch spring flexed between said abutments, anchor posts on respective abutments, and truss springs arranged in overlapping relation, each hooked to the anchor posts on respective abutments, said anchor posts and truss springs being arranged diagonally in reverse directions respectively relative to the plane of said base plate.

9. In a shock absorber, a base plate, a fixed abutment on said plate adjacent one end, a sliding abutment on said plate adjacent the opposite end, a flat arch spring flexed between said abutments to urge them apart, partially superposed truss springs arranged diagonally with respect to said base plate and lying between said plate and said arch spring and having their opposite ends engaging adjacent portions of respective abutments, said portions being diagonally disposed with respect to the plane of said base plate at an angle disposing said portions substantially perpendicular to the planes of said truss springs.

10. In a shock absorber, a base plate, fixed and movable abutments supported thereon, posts integrally formed with respective abutments at opposite sides thereof and extending in approximately parallel planes diagonal with respect to the plane of said base plate, partially superposed truss springs arranged at substantially right angles to said planes and each having its opposite ends hooked to a post on said fixed abutment and to a post on said movable abutment respectively, and a plate spring flexed between said abutments to urge them apart and to flex said truss springs opposing said spread.

11. In a shock absorber, a base plate, fixed and slidable abutments comprising postlike structures supported thereon, a plate spring flexed between said abutments to urge them apart, other resilient means comprising a plurality of partially superposed truss springs hooked to said structures, said structures and truss springs being diagonally disposed with respect to said plate and said structures and resilient means being substantially perpendicular to each other, said resilient means resisting the action of said plate spring.

12. In a shock absorber, a base plate, a fixed abutment on said plate adjacent one end, a sliding abutment adjacent the opposite end, an arch spring flexed between said abutments to urge them apart, partially superposed truss springs lying in generally parallel planes extending diagonally with respect to said plate laterally thereof and supported on said plate beneath said arch spring and having their opposite ends connected to said abutments respectively to resist the action of said arch spring.

13. In a shock absorber comprising a base plate, fixed and movable abutments supported thereon, a flexed plate spring having its ends seated against said abutments, a plurality of partially superposed resilient means lying in approximately parallel planes diagonally with respect to said base plate and supported on said base plate beneath said spring in operative engagement with said movable and fixed abutments to resist the spreading movement set up by said spring.

FRED E. BACHMAN.

REFERENCES CITED

The following references are of record in the file of this patent:

UNITED STATES PATENTS

| Number | Name | Date |
|---|---|---|
| 949,805 | Nesbitt | Feb. 22, 1910 |
| 1,263,513 | Bem | Apr. 23, 1915 |
| 1,481,138 | Luce et al. | Jan. 15, 1924 |
| 2,247,574 | Cottrell | July 1, 1941 |